(12) United States Patent
Weiss et al.

(10) Patent No.: US 11,981,514 B2
(45) Date of Patent: May 14, 2024

(54) STOCKPILE MODIFICATION SYSTEMS, METHODS AND APPARATUS

(71) Applicant: Superior Industries, Inc., Morris, MN (US)

(72) Inventors: Bryan Weiss, Morris, MN (US); Lafe Grimm, Morris, MN (US); Troy Plattner, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 220 days.

(21) Appl. No.: 17/658,917

(22) Filed: Apr. 12, 2022

(65) Prior Publication Data

US 2022/0324653 A1  Oct. 13, 2022

Related U.S. Application Data

(60) Provisional application No. 63/173,806, filed on Apr. 12, 2021.

(51) Int. Cl.
 *B65G 41/00* (2006.01)

(52) U.S. Cl.
 CPC ......... *B65G 41/008* (2013.01); *B65G 41/002* (2013.01); *B65G 2201/042* (2013.01); *B65G 2203/0233* (2013.01); *B65G 2203/0258* (2013.01)

(58) Field of Classification Search
 CPC .......... B65G 41/002; B65G 2203/0258; B65G 2203/0233; B65G 2201/047; B65G 2201/042; B65G 41/008
 USPC ................................ 198/312, 306, 301, 509
 See application file for complete search history.

(56) References Cited

U.S. PATENT DOCUMENTS

| | | | | |
|---|---|---|---|---|
| 6,360,876 B1 * | 3/2002 | Nohl | ...................... | B65G 69/10 198/588 |
| 9,731,905 B2 * | 8/2017 | Enge | ...................... | B65G 43/00 |

OTHER PUBLICATIONS

CN101104480 (Year: 2006).*

* cited by examiner

*Primary Examiner* — Gene O Crawford
*Assistant Examiner* — Lester Rushin, III
(74) *Attorney, Agent, or Firm* — Todd R. Fronek; Larkin Hoffman Daly & Lindgren, Ltd.

(57) ABSTRACT

Systems, methods and apparatus are provided for modifying a stockpile.

20 Claims, 9 Drawing Sheets

STOCKPILE MODIFICATION SYSTEMS, METHODS AND APPARATUS

BACKGROUND

Conveyors are used to transfer aggregate material, e.g., to storage locations such as in stockpiles.

DESCRIPTION

Figure 1:
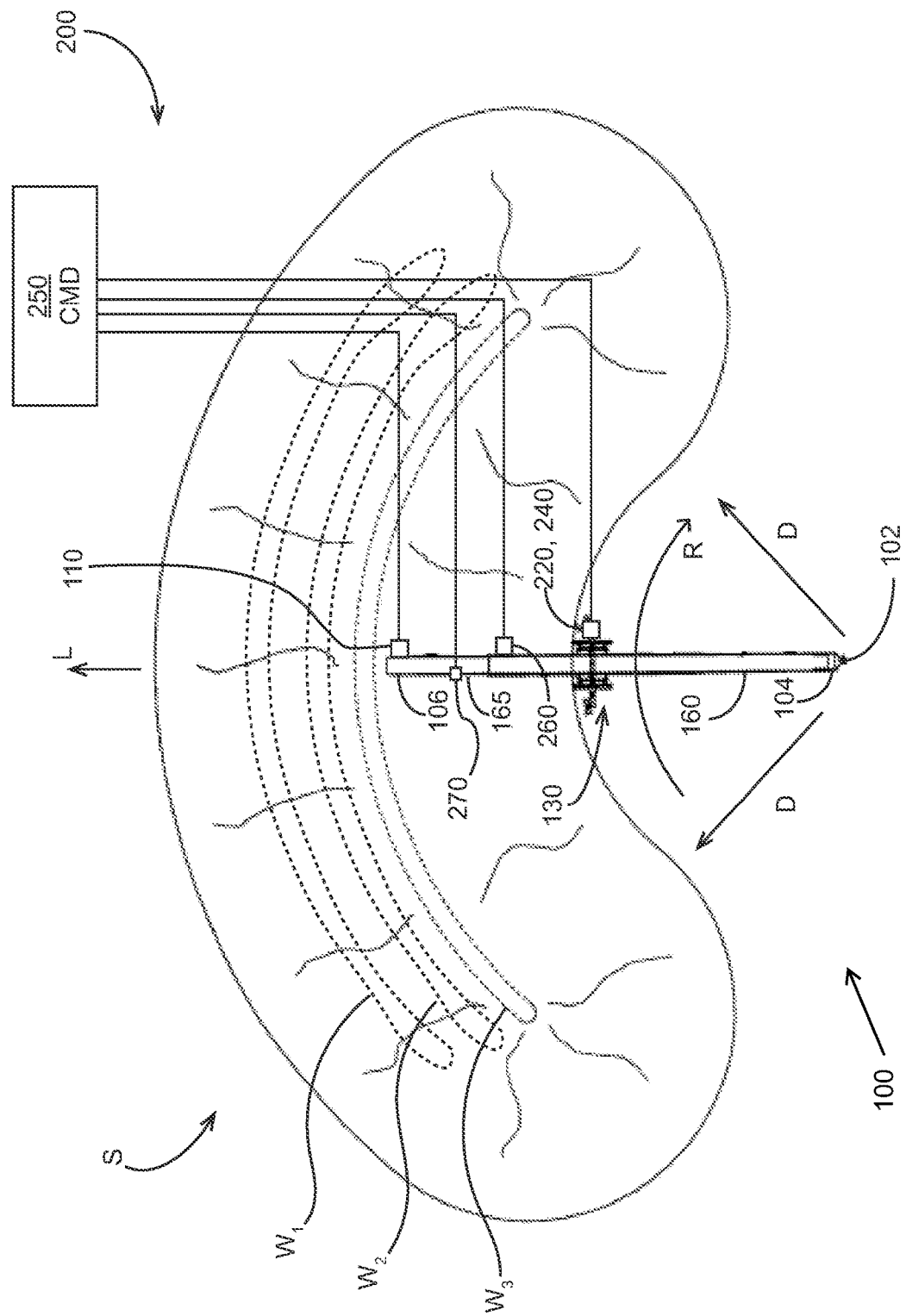
FIG. 1 is a top view of an embodiment of a stacking conveyor and schematically illustrates an embodiment of a conveyor control and monitoring system.
Figure 2:
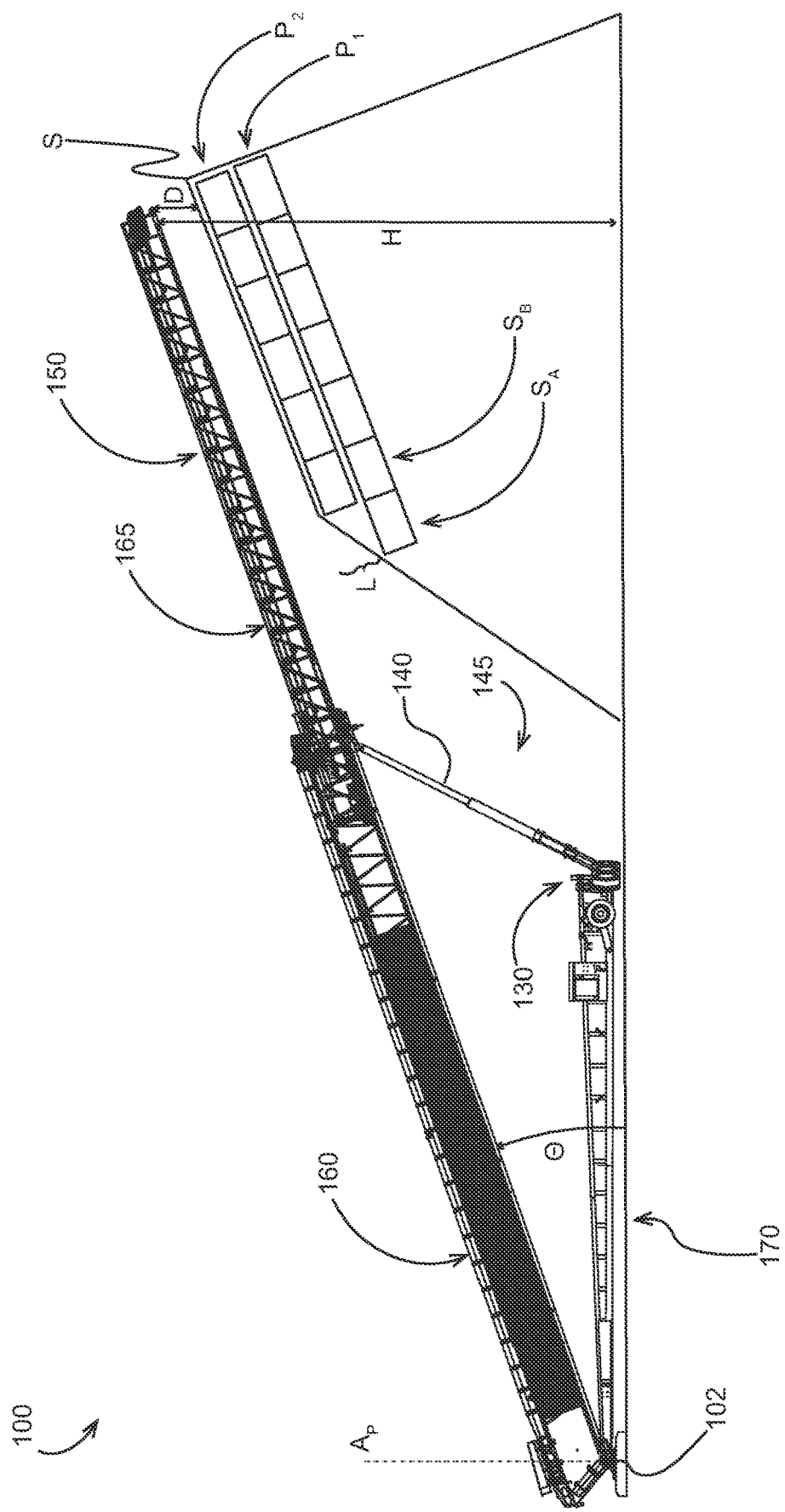
FIG. 2 is a side elevation view of the radial stacking conveyor of FIG. 1.

Referring to the drawings, wherein like reference numerals designate identical or corresponding parts throughout the several views, FIGS. 1 and 2 illustrate a radial stacking conveyor 100 unloading aggregate material to form a radial stockpile S (e.g., a radial stockpile having a shape known as a kidney bean shape, a rectangular stockpile, a linear stockpile, etc.) at least partially comprised of a plurality of windrows W (e.g., $W_1$, $W_2$, $W_3$). In some embodiments, the stockpile is formed using a radially arranged series of conical piles etc.

The conveyor 100 optionally includes a first truss 160 and a second truss 165 (e.g., stinger truss) operably supported on the first truss to be telescoped relative to the first truss 160. The first truss 160 is optionally pivotally supported on a pivot 102 such that the conveyor 100 is pivotable back and forth about pivot 102 along a radial direction R about a pivot axis Ap (see FIG. 2). A radial travel wheel assembly 130 optionally rollingly supports the first truss 160 during radial travel; in other embodiments, one or more side-to-side wheel assemblies instead support the truss during side-to-side travel. The first truss 160 operably supports a tail pulley 104. The second truss 165 operably supports a head pulley 106 (e.g., a driven head pulley). A drive 110 (e.g., electric motor) is optionally operably coupled to the head pulley 106 to drive rotation of the head pulley.

In some alternative embodiments, the conveyor 100 is configured to travel in a linear (side to side) fashion, e.g., in order to generate a rectangular or linear stockpile. Such embodiments the conveyor may comprise a rear wheel assembly rather than a tail pivot.

Referring to FIG. 2, a plurality of idler assemblies 150 (e.g., troughing idler assemblies, etc.) are optionally disposed along the length of the truss 160. The idler assemblies 150 optionally operably support an endless conveyor belt 155 which optionally extends around the head pulley 106 and tail pulley 104. A support strut 140 optionally supports the truss 160 at a generally forward end and is optionally coupled to an undercarriage 170 (which undercarriage also optionally supports the radial travel wheel assembly 130). The length of support strut 140 optionally determines the angle and elevation of the truss 160. In some embodiments, the support strut 140 is telescopic and optionally includes one or more actuators 145 (e.g., hydraulic cylinders) operably coupled to the strut 140 and configured to selectively extend and retract the strut 140 such that the truss 160 is respectively raised and lowered.

Continuing to refer to FIG. 2, during operation the conveyor 100 optionally creates the stockpile S by moving the head end of the conveyor along paths P (e.g., path P1, path P2, etc.) at a plurality of heights H (e.g., by raising and lowering the conveyor to various angles Θ) in order to create a plurality of layers L of the stockpile, where each path P optionally corresponds to a layer of the stockpile. The paths P may be horizontal, generally horizontal, or angled with respect to horizontal. The paths P are optionally stored in the memory of device 250 or may be carried out manually by an operator. Each path P optionally comprises a plurality of sub-paths S (e.g., sub-paths $S_A$, $S_B$, etc.) carried out at different extensions of the stinger truss 165. The sub-paths S may be radial (e.g., to create arcuate windrows W as shown in FIG. 1) or linear or other shape. In some methods, the system 200 described herein optionally monitors a distance D between the head end of the conveyor and the stockpile S and optionally increases the angle Θ (e.g., by extending the strut 140) by an increment when the distance D is less than a threshold distance.

Referring again to FIG. 1, a control and monitoring system 200 for controlling the conveyor 100 to create a stockpile S is illustrated schematically. The control system 200 optionally comprises one or more control and monitoring devices 250 (e.g., one or more devices having one or more of a graphical user interface, processor, memory in some embodiments) in data communication (e.g., wired, CAN bus, radio, wireless, Internet-based, etc.) with one, a plurality of, or all of the components of system 200 described herein and configured to receive data and/or send control signals to such components. The system 200 optionally comprises the drive 110. The system 200 optionally comprises one or more valves 220 fluidly coupled to the actuators 145 and configured to selectively extend and retract the actuators 145. The system 200 optionally comprises one or more drives 240 for driving wheels of the wheel assembly 130 to cause radial travel of the conveyor 100. The drives 240 optionally include or are supplemented by one or more shaft encoders or other devices for determining the radial travel and/or radial location of the conveyor 100 along radial travel direction R (alternatively, in some embodiments a time over which the wheel assembly is driven by the drives 240 is used to estimate the radial travel and/or radial location of the conveyor 100). The system 200 optionally comprises a pile sensor 212 which in various embodiments comprises a physical contact sensor such as a tilt switch, a non-contact proximity sensor (e.g., laser transmitter/receiver pair, ultrasonic transmitter/receiver pair, infrared transmitter/receiver pair, photoelectric 3D sensor such as the O3M available from ifm Efector, Inc. in Malvern, PA, etc.) The pile sensor 212 is optionally configured to generate one or more signals corresponding to one or more pile criteria: the height of the stockpile, the distance from the sensor 212 to the stockpile, and a Boolean value indicating whether the stockpile S is within a threshold vertical distance of the sensor. The sensor 212 is optionally configured to (e.g., continuously, repeatedly, intermittently, etc.) sense and store in memory one or more of the pile criteria. The system 200 optionally comprises a drive 260 (e.g. a winch drive such as a hydraulic or electric winch drive) for selectively extending and retracting the stinger truss 165 relative to the first truss 160 in order to increase or decrease the distance (e.g., measured along direction D) of the head pulley 106 from the pivot 102.

In some embodiments, the system 200 includes a material criterion sensor 270 (e.g., comprising a belt scale, a belt material sensor such as an ultrasonic transmitter/receiver pair, infrared transmitter/receiver pair, distance sensor, etc.) configured to determine one or more criteria related to the material on the belt (e.g., quantity, weight, presence, density, arrangement, particle size, particle size distribution, etc.).

It should be appreciated that due to a plurality of potential causes (e.g., intentional material removal from the stockpile, breakdown of the stockpile, etc.) the shape of the stockpile may differ from that initially created by the conveyor 100. For example, the stockpile may develop voids, holes, gaps, etc. In some scenarios, the desired shape of the stockpile is different from the current shape (e.g., the operator may decide to expand the footprint of the stockpile, connect two separate stockpiles, etc.) Various methods of using a system (e.g., system 200) to repair, fill in, improve, expand or otherwise modify an existing stockpile are provided herein.

Figure 3:
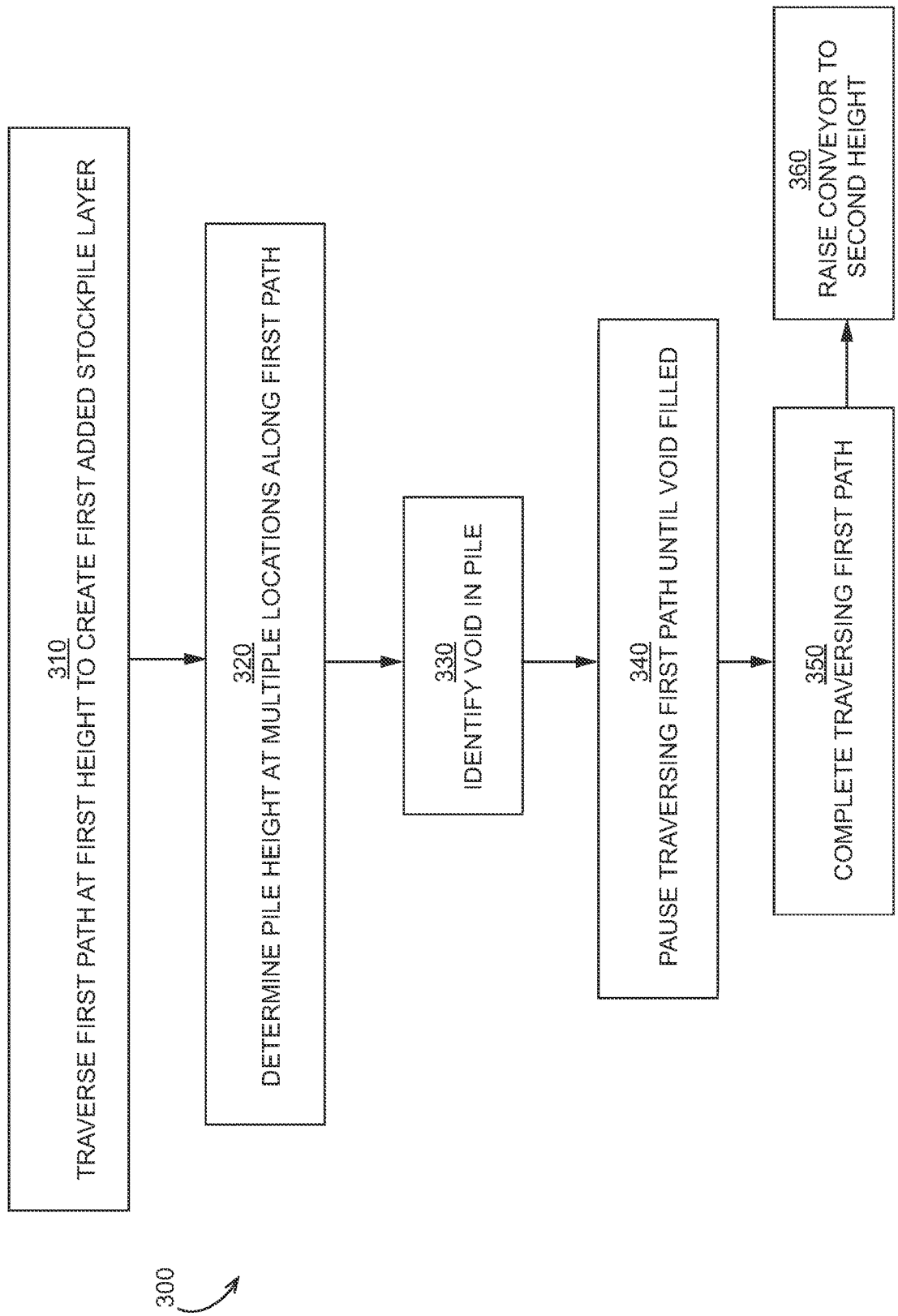
FIG. 3 illustrates a flow diagram of an embodiment of a method for modifying a stockpile.

Referring to FIG. 3, an embodiment of a flow diagram of a method 300 for modifying (e.g., one or more of the following: repairing, improving, building, completing forming, filling a void in, connecting two portions of, expanding, etc.) a stockpile is illustrated. Unless otherwise indicated, each step is executed by control and monitoring of a conveyor (e.g., conveyor 100) by a control and/or monitoring system (e.g., system 200). At step 310, the conveyor optionally traverses a first path P at a first height H while conveying material onto the stockpile S in order to create a first added stockpile layer L on an existing stockpile S. At step 320, the system optionally determines a stockpile height (e.g., by subtracting measured distance D from conveyor height H) at a plurality of locations along the first path P. At step 330, the system optionally identifies a void (e.g., upward-facing depression or hole, missing portion, removed portion, degraded portion, etc.) in the stockpile S. (It should be appreciated that the terms "pile" and "stockpile" are used interchangeably herein.) At step 340, the conveyor optionally pauses traversing the first path P until the conveyor has filled the void (e.g., when the system determines that the height of the stockpile at the void location has reached a threshold level due to continued conveying of material onto the stockpile S). At step 350, the conveyor optionally completes traversing the first path P while continuing to convey material onto the stockpile S in order to complete the first added layer L. At step 360, the conveyor is optionally raised to a second height H in order to create a second added layer L on the stockpile S.

Figure 4:
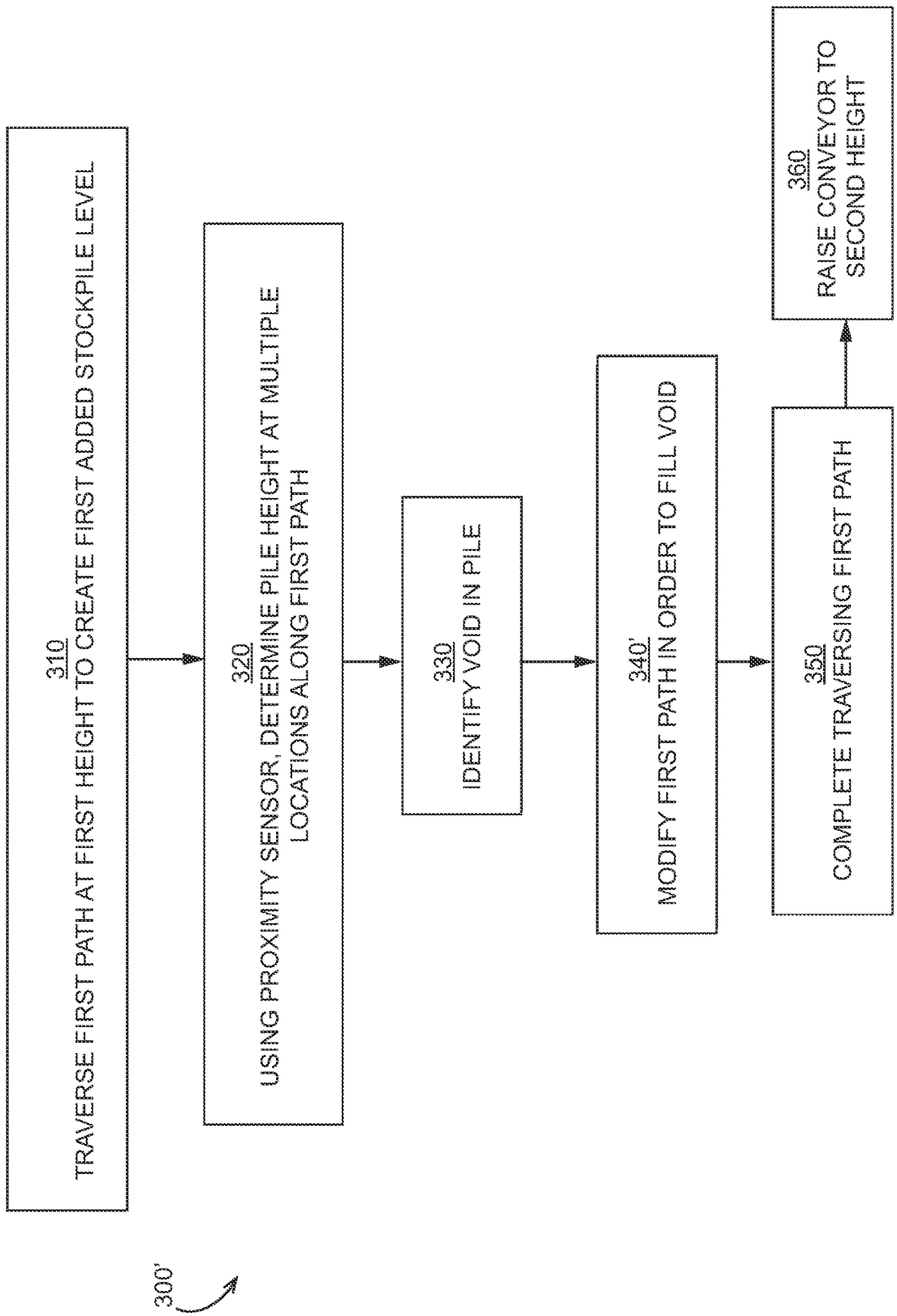
FIG. 4 illustrates another embodiment of a flow diagram of a method for modifying a stockpile.

Referring to FIG. 4, another embodiment of a flow diagram of a modified method 300' is illustrated which is identical to method 300 except as described herein. At modified step 340' of method 300', the system modifies the first path in order to fill the identified void. In some embodiments, step 340' includes moving the head end of the conveyor back and forth (e.g., radially on wheel assembly, side-to-side on a wheel assembly, linearly by extending and retracting a truss stinger, etc.) in an area near or overlapping the identified void. In some embodiments, step 340' includes reducing a speed of motion of the head end of the conveyor along path P in an area near or overlapping the identified void, e.g., to a slower but non-zero speed.

Figure 5:
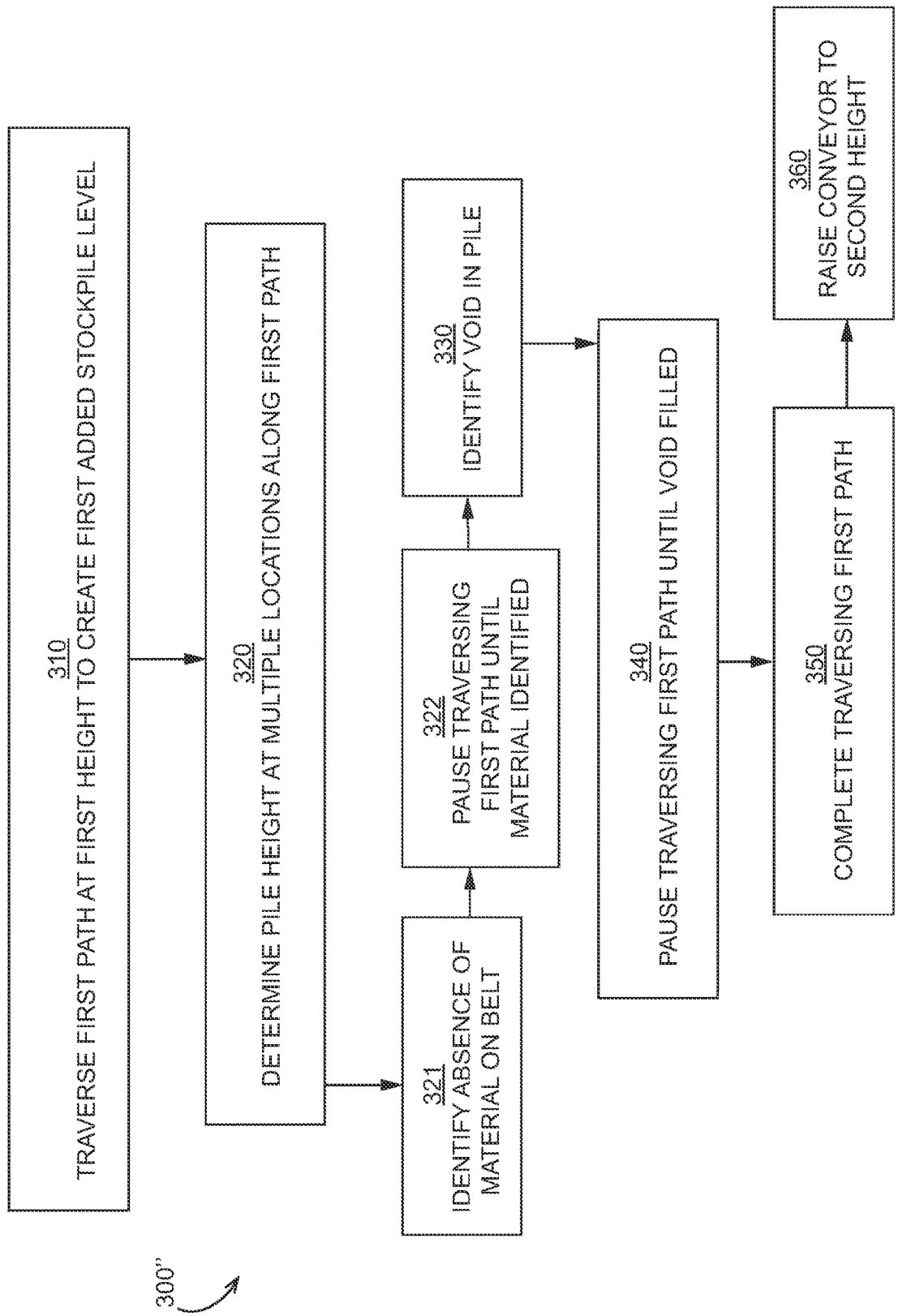
FIG. 5 illustrates another embodiment of a flow diagram of a method for modifying a stockpile.

Referring to FIG. 5, another embodiment of a flow diagram of a modified method 300" is illustrated which is identical to method 300 except as described herein. At additional step 321 of method 300", the system identifies the absence (or threshold minimum amount or weight or volume) of material on the conveyor belt, e.g., using a material criterion sensor 270. At additional step 322 of method 300", the system pauses traversing the first path P until a presence (or threshold minimum amount or weight or volume) of material is identified.

Figure 6:
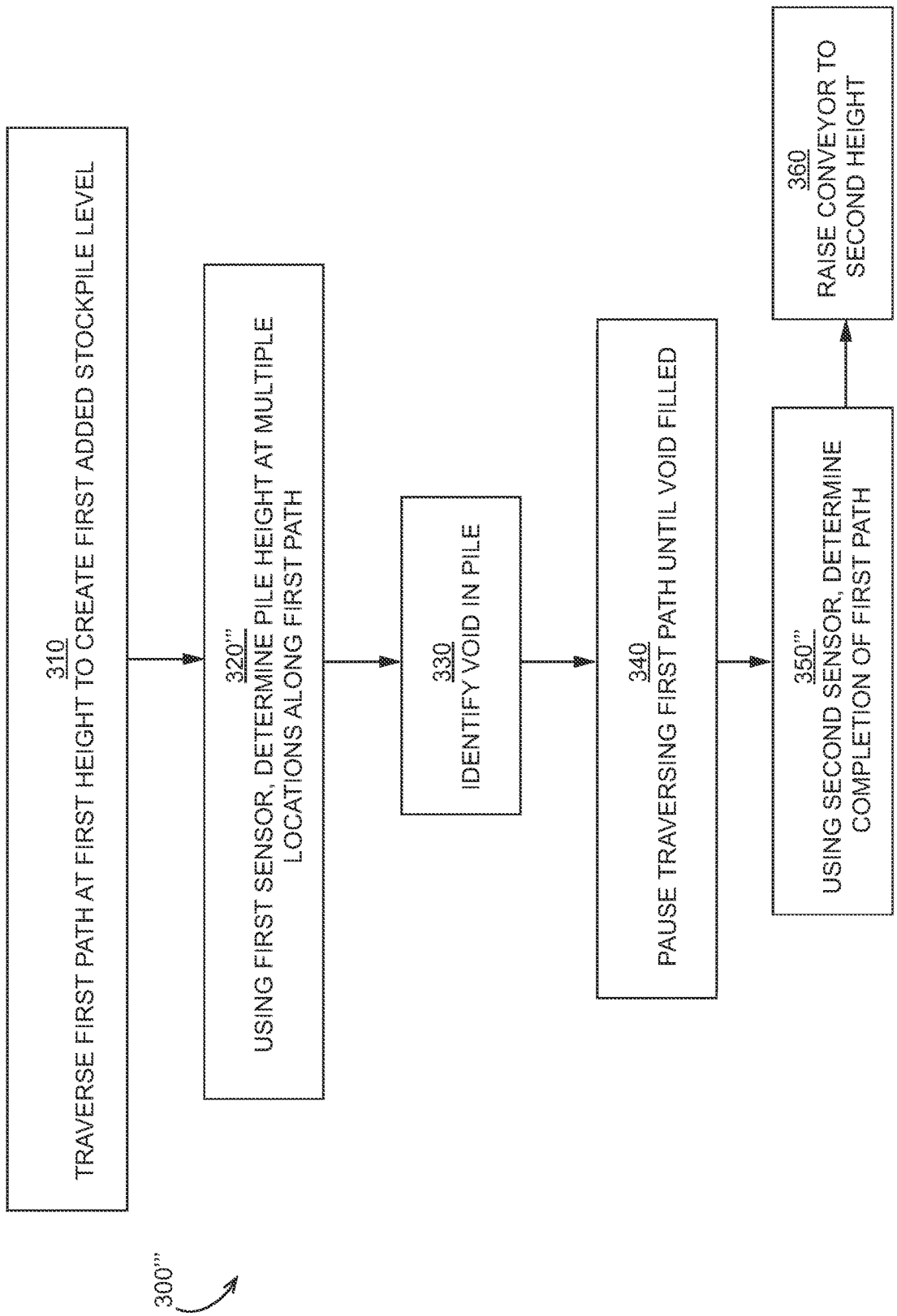
FIG. 6 illustrates another embodiment of a flow diagram of a method for modifying a stockpile.

Referring to FIG. 6, another embodiment of a flow diagram of a modified method 300''' is illustrated which is identical to method 300 except as described herein. Modified step 320''' of method 300''' is carried out using a first sensor. Modified step 350''' of method 300''' is carried out using a second sensor.

Figure 7:
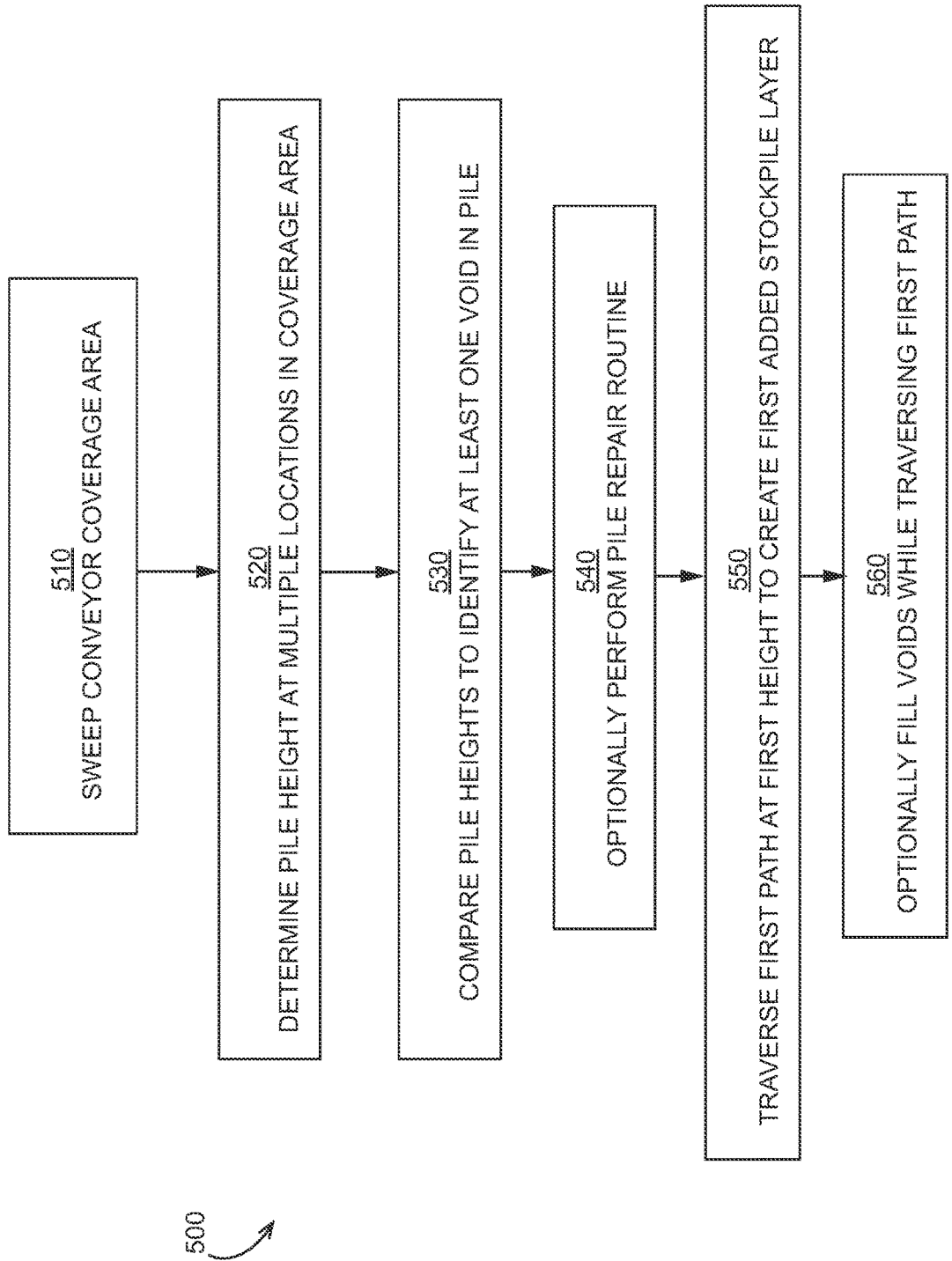
FIG. 7 illustrates another embodiment of a flow diagram of a method for modifying a stockpile.

Referring to FIG. 7, another embodiment of a flow diagram of a method 500 for modifying a stockpile is illustrated. At step 510, the system causes the conveyor to execute a dedicated "sweep" at least a portion of a conveyor coverage area by moving and/or selectively extending and retracting the conveyor truss to execute a sweep path (e.g., with or without conveying material) that substantially covers an area in which the conveyor is capable of creating a stockpile (e.g., based on user input, predetermined boundaries, conveyor dimensions, etc.). At step 520, while executing the "sweep" of the conveyor coverage area, the system optionally takes sensor measurements in order determines pile heights at a plurality of locations in the conveyor coverage area. At step 530, the system optionally compares the determined pile heights in order to identify the location of at least one void in the stockpile (e.g., by identifying an unacceptable variation between adjacent or pile heights, by identifying an unacceptable deviation in pile heights, etc.). At step 540, the system optionally causes the conveyor to perform a dedicated pile repair routine, e.g., by navigating the head of the conveyor to one or more identified void locations and unloading material until the identified voids have been filled. At step 550, the system optionally causes the conveyor to transverse a first path while conveying material in order to create a first added stockpile layer. In some embodiments, the system causes the conveyor to fill in one or more voids while traversing the first path (e.g., by modifying the path or speed of the conveyor or pausing to fill voids).

Figure 8:
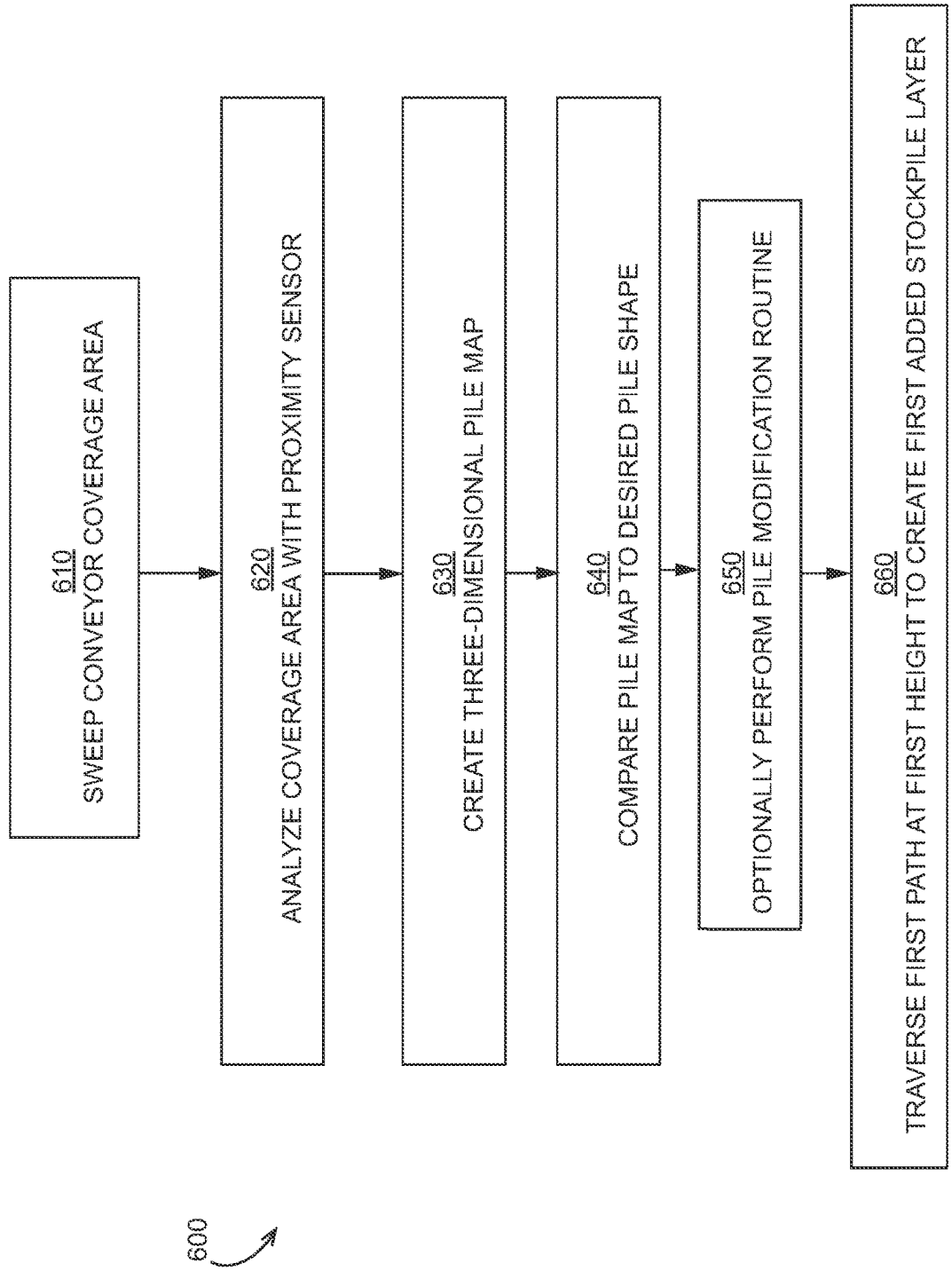
FIG. 8 illustrates another embodiment of a flow diagram of a method for modifying a stockpile.

Referring to FIG. 8, another embodiment of a flow diagram of a method 600 for modifying a stockpile is illustrated. At step 610, the system optionally causes the conveyor to sweep at least a portion of the conveyor coverage area. At step 620, while executing the sweep the system optionally uses a proximity sensor or other sensor to gather sensor data (e.g., continuously, intermittently, regularly, etc.) in order to analyze the coverage area. At step 630, the system optionally creates a map (e.g., a three-dimensional model which may be stored in memory of the system) of the stockpile. At step 640, the system compares the pile map to a desired pile shape (which desired pile shape may be, e.g., based on user input, stored in memory, etc.). At step 650, the system optionally causes the conveyor to perform a pile modification (e.g., pile repair, pile expansion, pile connection, etc.) routine. At step 660, the system optionally causes the conveyor to traverse a first stockpile creation path at a first height in order to create a first added stockpile layer. In some embodiments, some or all of the pile modification is performed while carrying out the first stockpile creation path (e.g., instead of first carrying out a dedicated pile modification routine).

Figure 9:
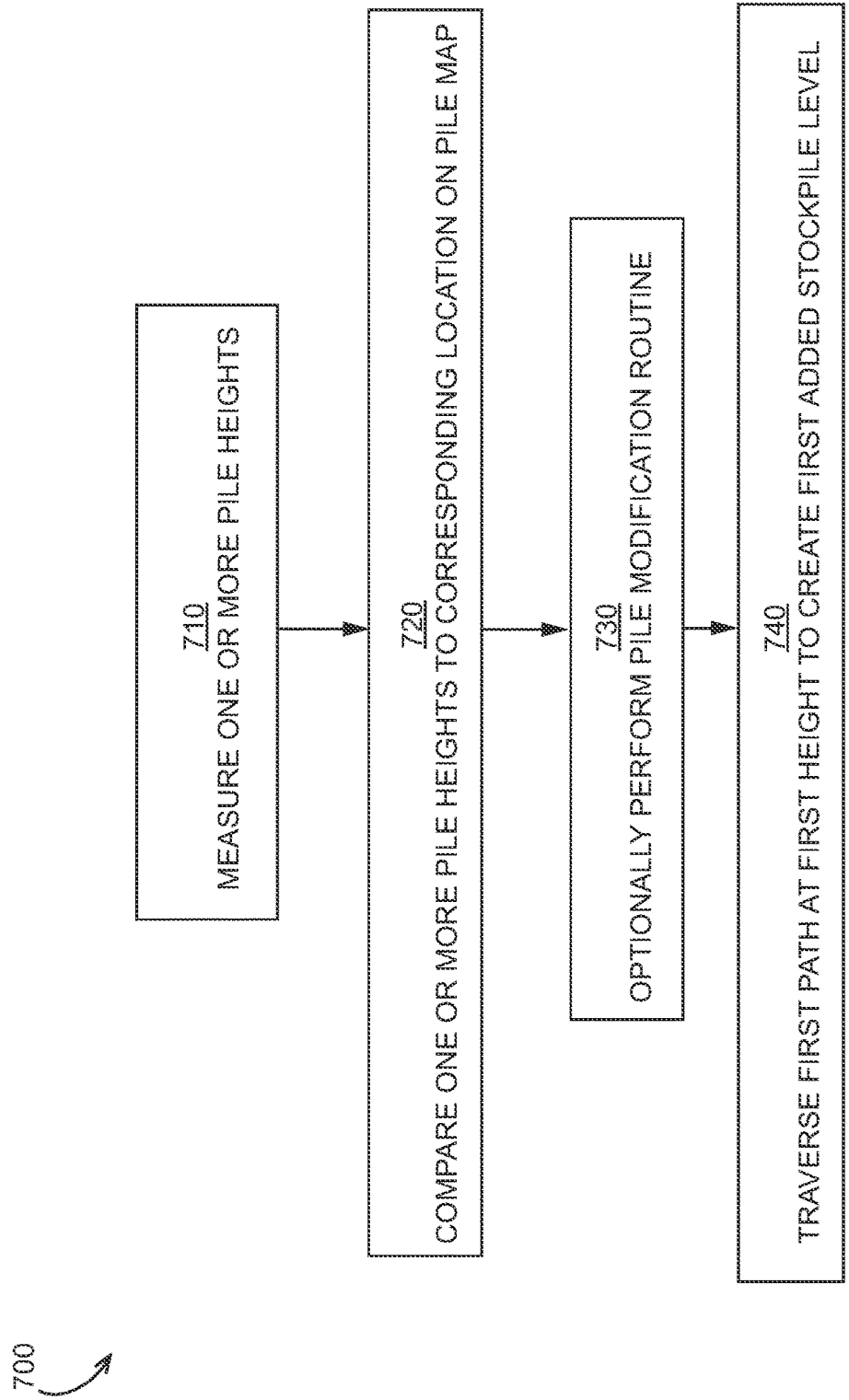
FIG. 9 illustrates another embodiment of a flow diagram of a method for modifying a stockpile.

Referring to FIG. 9, another embodiment of a flow diagram of a method 700 for modifying a stockpile is illustrated. At step 710, the system measures one or more stockpile heights. At step 720, the system compares one or more stockpile heights to a corresponding location on a stockpile map (e.g., 3-dimensional stockpile map). The stockpile map may be stored in memory of the system. The stockpile map may be generated by the system using a predetermined set of variables (e.g., angle of repose of the stockpiled material, coverage area of the conveyor, location of the conveyor, etc.) and/or based on user input such as the ideal stockpile boundaries, height, etc. At step 730, the system optionally causes the conveyor to perform a stockpile modification routine (e.g., to remove voids, repair removed areas or degradation, expand the stockpile, etc.). At step 740, the system optionally causes the conveyor to traverse a first path at a first height in order to create a first added stockpile layer.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A control system for a conveyor having an endless belt, at least a drive pulley and at least a radial travel wheel, the control system comprising:
    a pulley drive operably coupled to the drive pulley;
    a radial travel drive operably coupled to the radial travel wheel; and
    a first stockpile height sensor configured to measure an actual stockpile height; and
    a controller in data communication with said pulley drive and said radial travel drive, said controller configured to compare said actual stockpile height to a desired stockpile height.

2. The control system of claim 1, further comprising:
    a material criterion sensor configured to determine one or more criteria related to the material on the belt, wherein said controller is in data communication with said material criterion sensor.

3. The control system of claim 2, wherein said material criterion sensor comprises a belt scale.

4. The control system of claim 1, further comprising:
    a valve, said valve configured to selectively extend and retract at least a first actuator of the conveyor, wherein extension of the actuator modifies an operating height of the conveyor.

5. The control system of claim 4, wherein said valve is in data communication with said controller, wherein said controller is configured to modify said operating height of the conveyor.

6. The control system of claim 4, wherein said controller is configured to modify said operating height of the conveyor in response to said actual stockpile height.

7. The control system of claim 4, wherein said controller is configured to modify said operating height of the conveyor in response to a differential between said actual stockpile height and said desired stockpile height.

8. The control system of claim 1, wherein said desired stockpile height is based on a desired pile shape.

9. The control system of claim 1, further comprising:
    a second stockpile height sensor.

10. The control system of claim 9, wherein said second stockpile height sensor is in data communication with said controller.

11. The control system of claim 9, wherein said first stockpile height sensor is in data communication with said controller.

12. The control system of claim 1, wherein said first stockpile height sensor is in data communication with said controller.

13. The control system of claim 1, wherein said first stockpile height sensor comprises a non-contact sensor.

14. The control system of claim 13, wherein said non-contact sensor comprises a photoelectric 3D sensor.

15. The control system of claim 1, further comprising:
    a winch drive configured to alternately extend and retract a stinger truss of the conveyor, said winch drive being in data communication with said controller.

16. A method of modifying a stockpile, comprising:
    unloading a material onto the stockpile along a path;
    identifying a void in said stockpile; and
    performing one of pausing said path and modifying said path in order to fill said void.

17. The method of claim 16, wherein said step of identifying a void in said stockpile is carried out by a plurality of stockpile sensors.

18. The method of claim 16, wherein said step of identifying a void in said stockpile includes comparing an actual stockpile shape to a desired stockpile shape.

19. A method of modifying a stockpile, comprising:
    performing a stockpile mapping routine;
    identifying at least one void in said stockpile;
    performing a stockpile repair routine in order to fill said at least one void to generate a repaired stockpile; and
    unloading material onto the repaired stockpile along a path.

20. The method of claim 19, wherein said step of identifying a void in said stockpile is carried out by a plurality of stockpile sensors.

* * * * *